United States Patent
Vajapeyam et al.

(10) Patent No.: US 10,455,544 B2
(45) Date of Patent: Oct. 22, 2019

(54) ENHANCED PAGING PROCEDURES FOR MACHINE TYPE COMMUNICATIONS (MTC)

(71) Applicant: QUALCOMM Incorporated, San Diego, CA (US)

(72) Inventors: Madhavan Srinivasan Vajapeyam, San Diego, CA (US); Hao Xu, San Diego, CA (US); Wanshi Chen, San Diego, CA (US); Peter Gaal, San Diego, CA (US); Masato Kitazoe, Tokyo (JP); Miguel Griot, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 15/009,739

(22) Filed: Jan. 28, 2016

(65) Prior Publication Data

US 2016/0227513 A1   Aug. 4, 2016

Related U.S. Application Data

(60) Provisional application No. 62/113,936, filed on Feb. 9, 2015, provisional application No. 62/110,181, filed on Jan. 30, 2015.

(51) Int. Cl.
*H04W 68/02* (2009.01)
*H04W 68/00* (2009.01)
(Continued)

(52) U.S. Cl.
CPC ............ *H04W 68/02* (2013.01); *H04W 4/06* (2013.01); *H04W 4/70* (2018.02); *H04W 68/005* (2013.01);
(Continued)

(58) Field of Classification Search
CPC ..... H04W 4/005; H04W 4/06; H04W 68/005; H04W 68/02; H04W 68/025; H04W 72/0446; H04W 74/0833; H04W 4/70
See application file for complete search history.

(56) References Cited

U.S. PATENT DOCUMENTS 8,682,357 B2 * 3/2014 Worrall ................. H04W 68/00
                                                      455/458
9,451,639 B2 * 9/2016 Li ....................... H04W 74/0833
(Continued)

FOREIGN PATENT DOCUMENTS

CN      108353381 A  *  7/2018  .............. H04W 4/70
EP       2903363 A1  *  8/2015  .............. H04W 8/22
(Continued)

OTHER PUBLICATIONS

New Postcom, "UL Coverage Improvement and Evaluation for Low Cost MTC", 3GPP Draft, R1-144178, 3rd Generation Partnership Project (3GPP), 3GPP TSG-RAN WG1 Meeting#72bis, Apr. 19, 2013, pp. 1-4.*
(Continued)

*Primary Examiner* — Eric Nowlin
(74) *Attorney, Agent, or Firm* — Patterson & Sheridan, LLP

(57) ABSTRACT

Certain aspects of the present disclosure generally relate to wireless communications, and more specifically to enhanced paging procedures for devices with limited communications resources, such as machine type communication (MTC) devices and enhanced or evolved MTC (eMTC) devices. An example method generally includes determining a set of subframes corresponding to a paging occasion for the UE to receive a paging message from a base station (BS), determining, within the set of subframes, at least one narrowband region for receiving the paging message, and monitoring for
(Continued)

the paging message in the at least one narrowband region within the set of subframes.

45 Claims, 13 Drawing Sheets

(51) Int. Cl.
   *H04W 72/04* (2009.01)
   *H04W 74/08* (2009.01)
   *H04W 4/06* (2009.01)
   *H04W 4/70* (2018.01)

(52) U.S. Cl.
   CPC ... *H04W 72/0446* (2013.01); *H04W 74/0833* (2013.01); *H04W 68/025* (2013.01)

(56) References Cited

U.S. PATENT DOCUMENTS

| | | | | |
|---|---|---|---|---|
| 9,462,571 | B2* | 10/2016 | Cui | H04W 68/02 |
| 9,532,330 | B2* | 12/2016 | Worrall | H04W 68/00 |
| 9,699,710 | B2* | 7/2017 | Lee | H04W 48/12 |
| 9,942,875 | B2* | 4/2018 | Worrall | H04W 68/00 |
| 10,165,423 | B2* | 12/2018 | Rico Alvarino | H04W 4/70 |
| 2013/0015953 | A1* | 1/2013 | Hsu | H04W 4/005 340/7.46 |
| 2014/0313999 | A1* | 10/2014 | Xu | H04W 72/042 370/329 |
| 2015/0016312 | A1* | 1/2015 | Li | H04W 74/0833 370/280 |
| 2015/0078329 | A1* | 3/2015 | Zhu | H04L 5/0005 370/330 |
| 2015/0173073 | A1* | 6/2015 | Lindoff | H04W 52/245 370/329 |
| 2015/0365914 | A1* | 12/2015 | Yu | H04W 68/02 455/458 |
| 2016/0174189 | A1* | 6/2016 | Yoshizawa | H04W 52/0216 455/458 |
| 2016/0183295 | A1* | 6/2016 | Liu | H04W 72/042 370/330 |
| 2016/0212727 | A1* | 7/2016 | Hu | H04W 68/025 |
| 2016/0219622 | A1* | 7/2016 | Liu | H04L 5/0089 |
| 2016/0227513 | A1* | 8/2016 | Vajapeyam | H04W 68/005 |
| 2016/0227582 | A1* | 8/2016 | Vajapeyam | H04W 4/70 |
| 2016/0301503 | A1* | 10/2016 | Rico Alvarino | H04B 1/713 |
| 2016/0309282 | A1* | 10/2016 | Xu | H04W 24/08 |
| 2016/0309468 | A1* | 10/2016 | Chen | H04W 4/70 |
| 2016/0316491 | A1* | 10/2016 | Axmon | H04W 74/0833 |
| 2016/0338005 | A1* | 11/2016 | Lim | H04W 8/22 |
| 2016/0353420 | A1* | 12/2016 | You | H04L 5/0053 |
| 2017/0013391 | A1* | 1/2017 | Rico Alvarino | H04W 4/70 |
| 2017/0164250 | A1* | 6/2017 | Kim | H04W 36/0094 |
| 2017/0245241 | A1* | 8/2017 | Yu | H04W 68/02 |
| 2017/0280481 | A1* | 9/2017 | Stern-Berkowitz | H04W 74/008 |
| 2017/0339658 | A1* | 11/2017 | Wang | G01S 5/021 |
| 2017/0374646 | A1* | 12/2017 | Takeda | H04W 68/00 |
| 2019/0090113 | A1* | 3/2019 | Rico Alvarino | H04W 4/70 |

FOREIGN PATENT DOCUMENTS

| | | | | |
|---|---|---|---|---|
| EP | 3372025 | A1 * | 9/2018 | H04W 4/70 |
| KR | 20180089400 | A * | 8/2018 | H04W 4/70 |
| WO | WO-2013174297 | A1 * | 11/2013 | H04L 5/0005 |
| WO | WO-2013183966 | A1 | 12/2013 | |
| WO | WO 2014109621 | A1 * | 7/2014 | H04L 5/0053 |
| WO | WO 2016120419 | A2 * | 8/2016 | H04W 8/22 |
| WO | WO-2017079574 | A1 * | 5/2017 | H04W 4/70 |

OTHER PUBLICATIONS

Sierra Wireless, "7.2.1.2.1 Physical data channels and associated physical control channels", 3GPP Draft, R1-150068, 3rd Generation Partnership Project (3GPP), 3GPP TSG-RAN WG1 Meeting#80, Feb. 13, 2015, pp. 1-4.*

Ericsson, "Bundle sizes for MTC", 3GPP Draft, R1-157854, 3rd Generation Partnership Project (3GPP), 3GPP TSG-RAN WG1 Meeting#83, Nov. 22, 2015, pp. 1-3.*

3rd Generation Partnership Project; Technical Specification Group Radio Access Network; Evolved Universal Terrestrial Radio Access (E-UTRA); User Equipment (UE) Procedures in Idle Mode (Release 11), 3GPP Standard; 3GPP TS 36.304, 3rd Generation Partnership Project (3GPP), Mobile Competence Centre; 650, Route Des Lucioles; F-06921 Sophia-Antipolis Cedex; France vol. RAN WG2, No. V11.6.0, Jan. 2, 2014, pp. 1-34, XP050729346, [retrieved on Jan. 2, 2014].

International Search Report and Written Opinion—PCT/US2016/015543—ISA/EPO—dated May 12, 2016.

Nokia Networks, et al., "Common Control Messages for MTC," 3GPP Draft; R1-144178, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014, Sep. 27, 2014, pp. 1-2, XP050869822, Retrieved from the Internet URL: http://www.3gpp.org/ftp/tsg_ran/WG1_RL1/TSGR1_78b/Docs/ , [retrieved on Sep. 27, 2014].

Qualcomm Incorporated: "UE Complexity Reduction," 3GPP Draft; R1-143992 UE Complexity Reduction, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014, Sep. 27, 2014, pp. 1-3, XP050869657, Retrieved from the Internet URL: http://www.3gpp.org/ftp/tsg_ran/WG1_RL1/TSGR1_78b/Docs/, [retrieved on Sep. 27, 2014].

ZTE: "Considerations on Common Control Messages for MTC Enhancement," 3GPP Draft; R1-143809, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014, Sep. 27, 2014, XP050869492, Retrieved from the Internet URL: http://www.3gpp.org/ftp/tsg_ran/WG1_RL1/TSGR1_78b/Docs/ , retrieved on Sep. 27, 2014, p. 1, line 28-p. 2, line 24, p. 3, lines 30-37.

* cited by examiner

ENHANCED PAGING PROCEDURES FOR MACHINE TYPE COMMUNICATIONS (MTC)

CROSS-REFERENCE TO RELATED APPLICATION & PRIORITY CLAIM

This application claims benefit of and priority to U.S. Provisional Patent Application Ser. No. 62/110,181, filed Jan. 30, 2015, and U.S. Provisional Patent Application Ser. No. 62/113,936, filed Feb. 9, 2015, which are herein incorporated by reference in their entirety for all applicable purposes.

BACKGROUND

Field of the Disclosure

Certain aspects of the present disclosure generally relate to wireless communications and, more specifically, to enhanced paging procedures for devices with limited communications resources, such as machine type communication(s) (MTC) devices and enhanced or evolved MTC (eMTC) devices. The term MTC generally applies to a broad class of devices in wireless communications including, but not limited to: Internet of Things (IoT) devices, Internet of Everything (IoE) devices, wearable devices and low cost devices.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for enhancing paging procedures in MTC and eMTC. MTC/eMTC devices include devices such as sensors, meters, monitors, location tags, drones, trackers, robots/robotic devices, etc. To enhance coverage of certain devices, such as MTC devices, "bundling" may be utilized, in which certain transmissions are sent as a bundle of transmissions, for example, with the same information transmitted over multiple subframes. Certain aspects of present disclose relate to determining resources used for paging and determining a bundling size for paging.

Certain aspects of the present disclosure provide a method for wireless communications by a user equipment (UE). The method generally includes determining a set of subframes corresponding to a paging occasion for the UE to receive a paging message from a base station (BS), determining, within the set of subframes, at least one narrowband region for receiving the paging message, and monitoring for the paging message in the at least one narrowband region within the set of subframes.

Certain aspects of the present disclosure provide an apparatus for wireless communications. The apparatus generally includes means for determining a set of subframes corresponding to a paging occasion for the UE to receive a paging message from a BS, means for determining, within the set of subframes, at least one narrowband region for receiving the paging message, and means for monitoring for the paging message in the at least one narrowband region within the set of subframes.

Certain aspects of the present disclosure provide an apparatus for wireless communications. The apparatus generally includes at least one processor configured to determine a set of subframes corresponding to a paging occasion for the UE to receive a paging message from a BS, determine, within the set of subframes, at least one narrowband region for receiving the paging message, and monitor for the paging message in the at least one narrowband region within the set of subframes. The apparatus may further include a memory coupled with the at least one processor.

Certain aspects of the present disclosure provide a computer readable medium having computer executable code stored thereon. The computer executable code generally includes code for determining a set of subframes corresponding to a paging occasion for the UE to receive a paging message from a BS, code for determining, within the set of subframes, at least one narrowband region for receiving the paging message, and code for monitoring for the paging message in the at least one narrowband region within the set of subframes.

Certain aspects of the present disclosure provide a method for wireless communications by a BS. The method generally includes determining a set of subframes corresponding to a paging occasion for transmitting a paging message to a UE, determining, within the set of subframes, at least one narrowband region for transmitting the paging message to the UE, and transmitting the paging message to the UE in the at least one narrowband region of the set of subframes.

Certain aspects of the present disclosure provide an apparatus for wireless communications. The apparatus generally includes means for determining a set of subframes corresponding to a paging occasion for transmitting a paging message to a UE, means for determining, within the set of subframes, at least one narrowband region for transmitting the paging message to the UE, and means for transmitting the paging message to the UE in the at least one narrowband region of the set of subframes.

Certain aspects of the present disclosure provide an apparatus for wireless communications. The apparatus generally includes at least one processor configured to determine a set of subframes corresponding to a paging occasion for transmitting a paging message to a UE, and determine, within the set of subframes, at least one narrowband region for transmitting the paging message to the UE. The apparatus may also include a transmitter configured to transmit the paging message to the UE in the at least one narrowband region of the set of subframes. The apparatus may further include a memory coupled with the at least one processor.

Certain aspects of the present disclosure provide a computer readable medium having computer executable code stored thereon. The computer executable code generally includes code for determining a set of subframes corresponding to a paging occasion for transmitting a paging message to a UE, code for determining, within the set of subframes, at least one narrowband region for transmitting the paging message to the UE, and code for transmitting the paging message to the UE in the at least one narrowband region of the set of subframes.

Numerous other aspects are provided including methods, apparatus, systems, computer program products, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
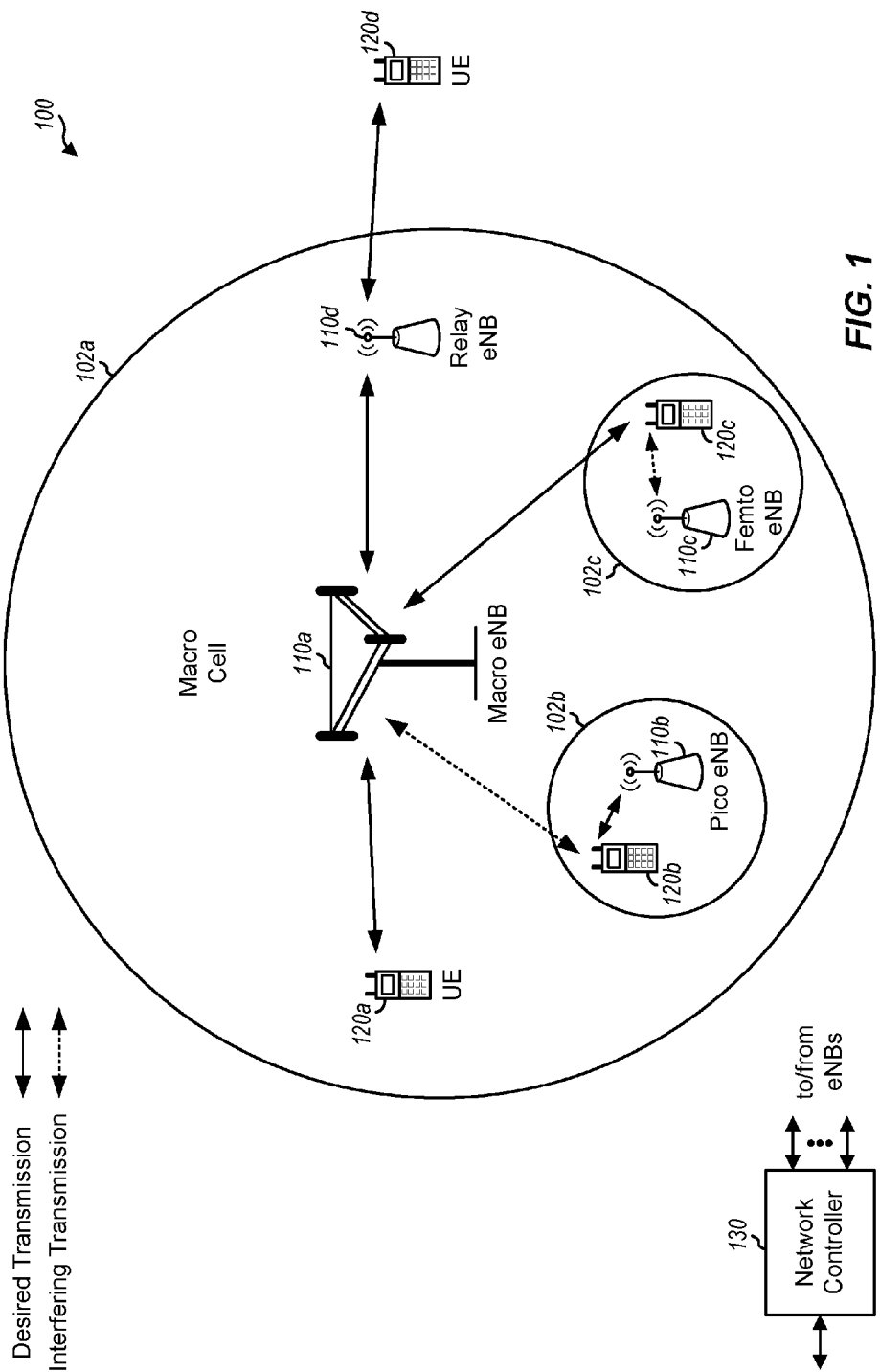
FIG. 1 is a block diagram conceptually illustrating an example wireless communication network, in accordance with certain aspects of the present disclosure.

Aspects of the present disclosure provide techniques and apparatus for enhanced paging procedures for devices with limited communication resources, such as MTC devices (e.g., low cost MTC devices, low cost eMTC devices). MTC devices may be implemented as narrowband IoT (NB-IoT) devices. The low cost MTC devices may co-exist with other legacy devices in a particular radio access technology (RAT) (e.g., long term evolution (LTE)) and may operate on one or more narrowband regions partitioned out of an available system bandwidth that is supported by the particular RAT. The low cost MTC devices may also support different modes of operation, such as a coverage enhanced mode (e.g., where repetitions of the same message may be bundled or transmitted across multiple subframes), a normal coverage mode (e.g., where repetitions may not be transmitted), etc.

Accordingly, as will be described in more detail below, the techniques presented herein may allow for low cost devices to determine, from the available system bandwidth, which narrowband region(s) the low cost devices should monitor for a bundled paging message transmitted from a base station (BS)/network. As will also be described in more detail below, techniques presented herein may also allow for the determination and/or adaptation of the bundling size for the paging message based on one or more triggers.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA)

networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced.

For example, one or more paging procedure enhancements for certain UEs 120 (e.g., low cost machine type communication (MTC) UEs, low cost enhanced MTC (eMTC) UEs, etc.) in the wireless communication network 100 may be supported. According to the techniques presented herein, the eNBs 110 and UE(s) 120 in the wireless communication network 100 may be able to determine, from the available system bandwidth supported by the wireless communication network 100, which narrowband region(s) the UE(s) 120 should monitor for a bundled paging message transmitted from the eNBs 110 in the wireless communication network 100. Also, according to techniques described herein, the eNBs 110 and/or UE(s) 120 in the wireless communication network 100 may be able to determine and/or adapt the bundling size for the paging message based on one or more triggers in the wireless communication network 100.

The wireless communication network 100 may be a long term evolution (LTE) network or some other wireless network. Wireless communication network 100 may include a number of evolved Node Bs (eNBs) 110 and other network entities. An eNB is an entity that communicates with UEs and may also be referred to as a base station (BS), a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, an entertainment device (e.g., music player, gaming device, etc.), a camera, a vehicular device, a navigation device, a drone, a robot/robotic device, a wearable device (e.g., smart watch, smart clothing, smart wristband, smart ring, smart bracelet, smart glasses, virtual reality goggles), etc.

One or more UEs 120 in the wireless communication network 100 (e.g., an LTE network) may also be low cost, low data rate devices, e.g., such as low cost MTC UEs, low cost eMTC UEs, etc. The low cost UEs may co-exist with legacy and/or advanced UEs in the LTE network and may have one or more capabilities that are limited when compared to the other UEs (e.g., non-low cost UEs) in the wireless network. For example, when compared to legacy and/or advanced UEs in the LTE network, the low cost UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as low cost UEs. Similarly, legacy devices, such as legacy and/or advanced UEs (e.g., in LTE) are referred to generally as non-low cost UEs.

Figure 2:
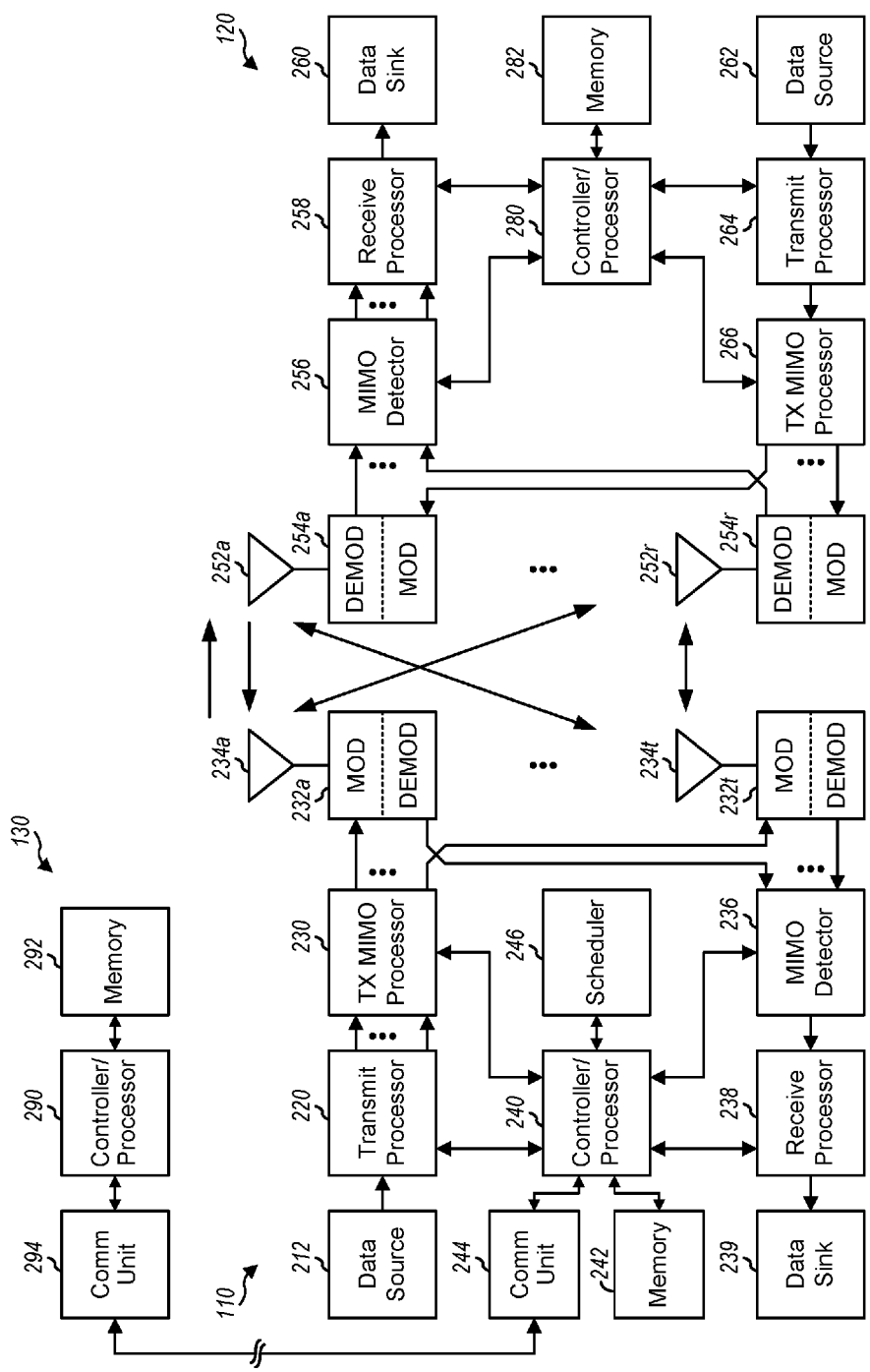
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, wherein general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 700 illustrated in FIG. 7 and/or other processes for the techniques described herein. Similarly, controller/processor 280 and/or other processors and modules at UE 120 may perform or direct operations 600 illustrated in FIG. 6 and/or processes for the techniques described herein. Memories 242 and 282 may store data and program codes for BS 110 and UE 120, respectively. A scheduler 246 may schedule UEs for data transmission on the downlink and/or uplink.

Figure 3:
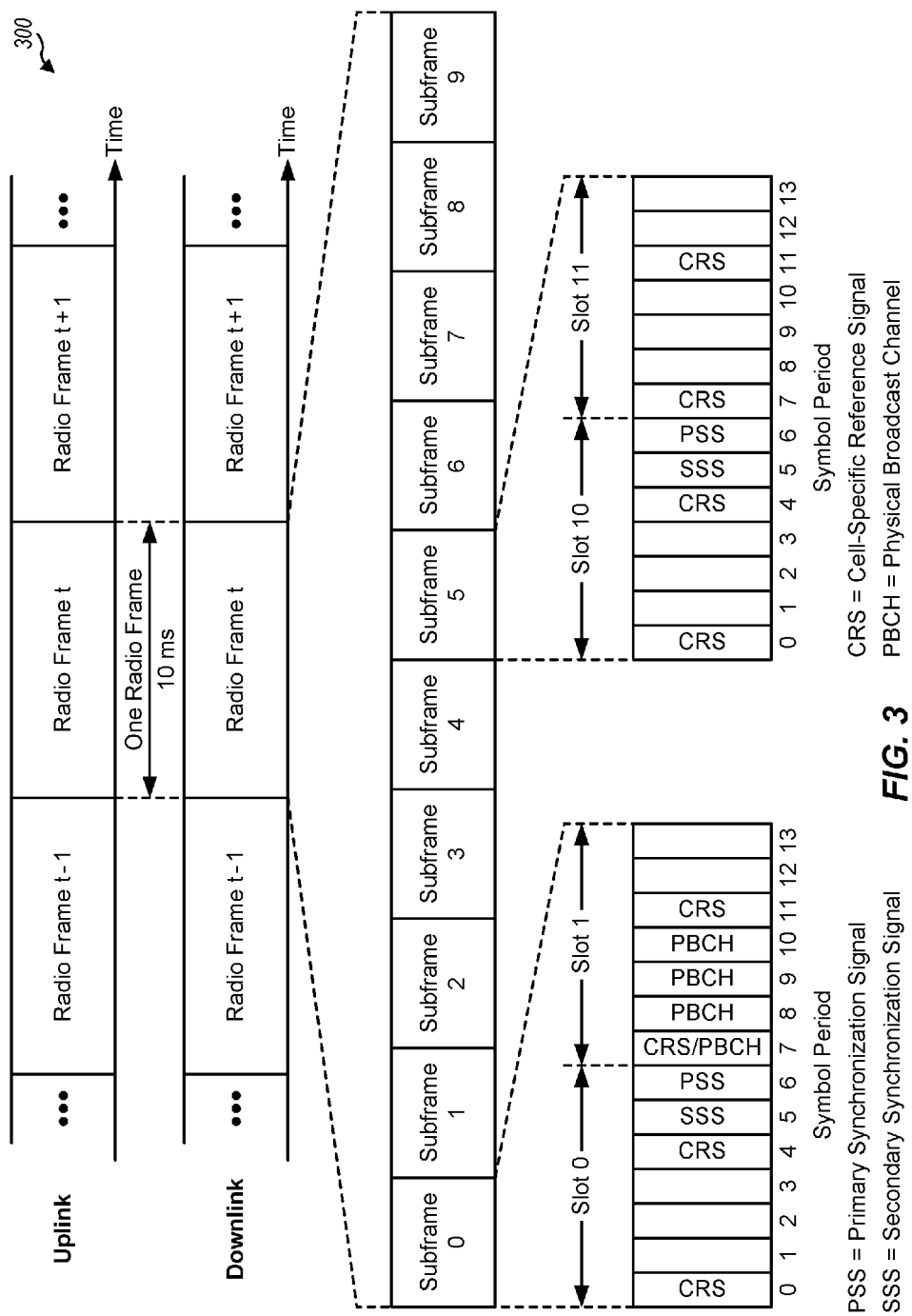
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
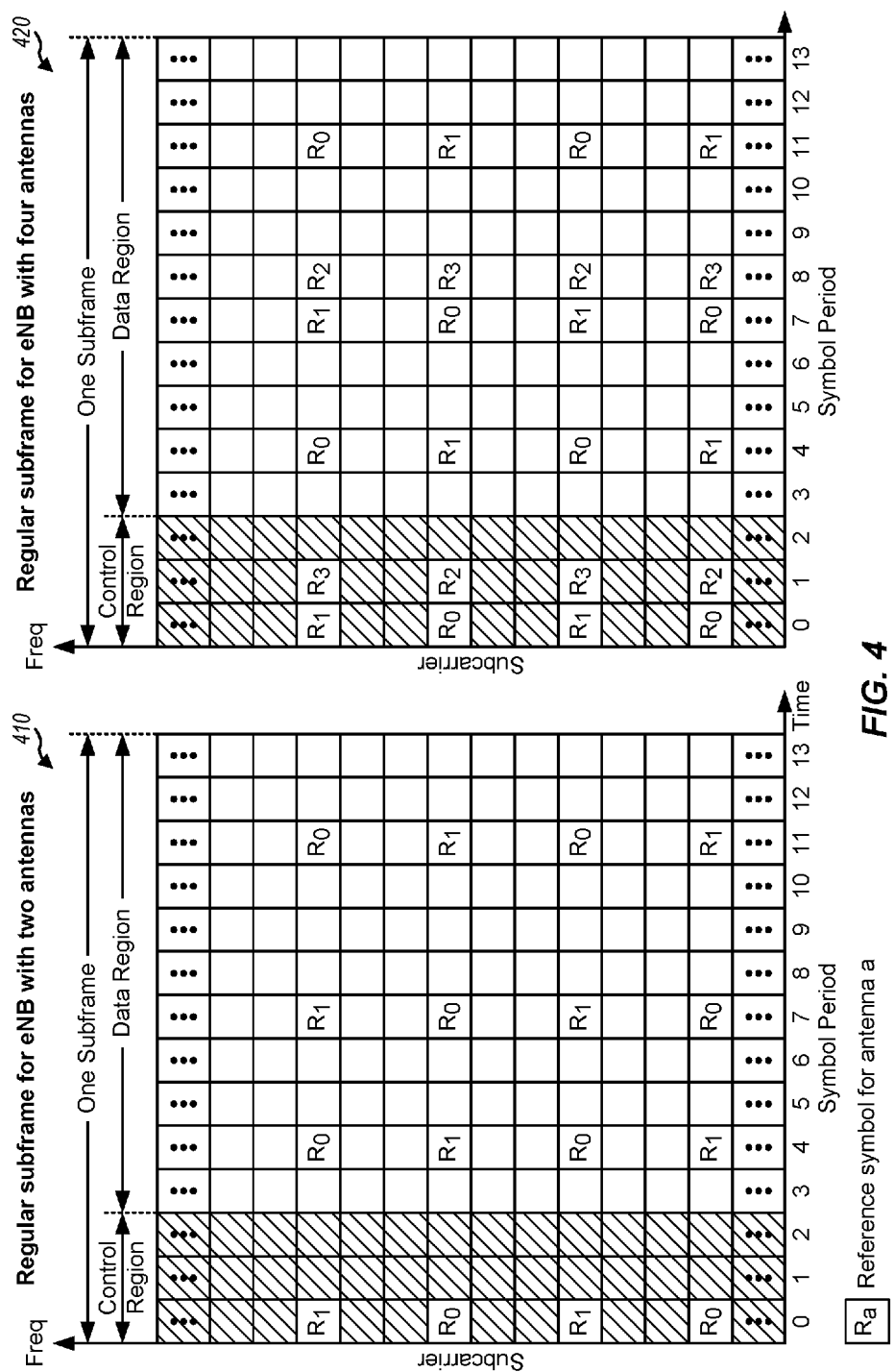
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as low cost UEs, as compared to other (non-low cost) devices in the wireless communication network.

Example Low Cost MTC

In some systems, for example, in LTE Rel-13, a low cost UE may be limited to a particular narrowband assignment (e.g., of no more than six resource blocks (RBs)) within the available system bandwidth. However, the low cost UE may be able to re-tune (e.g., to operate and/or camp) to different narrowband regions within the available system bandwidth of the LTE system, for example, in order to co-exist within the LTE system.

As another example of coexistence within the LTE system, low cost UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the low cost UE may be able to receive the legacy PBCH with one or more additional repetitions of the PBCH across multiple subframes (e.g., bundled). As another example, the low cost UE may be able to transmit one or more repetitions of PRACH (e.g., with one or more PRACH formats supported) to an eNB (e.g., eNB 110) in the LTE system. The PRACH can be used to identify the low cost UE. Also, the number of repeated PRACH attempts can be configured by the eNB.

The low cost UE may also be a link budget limited device and may operate in different modes of operation (e.g., using different numbers of repetitions for messages transmitted to or from the low cost UE) based on its link budget limitation. For example, in some cases, the low cost UE may operate in a normal coverage mode in which there is little to no repetition (e.g., the amount of repetition needed for the UE to successfully receive and/or transmit a message may be low or repetition may not even be needed). Alternatively, in some cases, the low cost UE may operate in a coverage enhancement (CE) mode in which there may be high amounts of repetition. For example, for a 328 bit payload, a low cost UE in CE mode may need 150 or more repetitions of the payload in order to successfully transmit and/or receive the payload.

In some cases (e.g., for LTE Rel-13), the low cost UE may have limited capabilities with respect to its reception of broadcast and unicast transmissions. For example, the maximum transport block (TB) size for a broadcast transmission received by the low cost UE may be limited to 1000 bits. Additionally, in some cases, the low cost UE may not be able to receive more than one unicast TB in a subframe. In some cases (e.g., for both the CE mode and normal mode described above), the low cost UE may not be able to receive more than one broadcast TB in a subframe. Further, in some cases, the low cost UE may not be able to receive both a unicast TB and a broadcast TB in a subframe.

For MTC, low cost UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-low cost UEs. For example, as compared to conventional paging messages used in LTE, low cost UEs may be able to monitor and/or receive paging messages that non-low cost UEs may not be able to monitor and/or receive. Similarly, as compared to conventional random access response (RAR) messages used in a conventional random access procedure, low cost UEs may be able to receive RAR messages that non-low cost UEs may not be able to receive. The new paging and RAR messages associated with low cost UEs may also be repeated one or more times (e.g., bundled). In addition, different numbers of repetitions (e.g., different bundling sizes) for the new messages may be supported.

Example MTC Coexistence within a Wideband System

Figure 5:
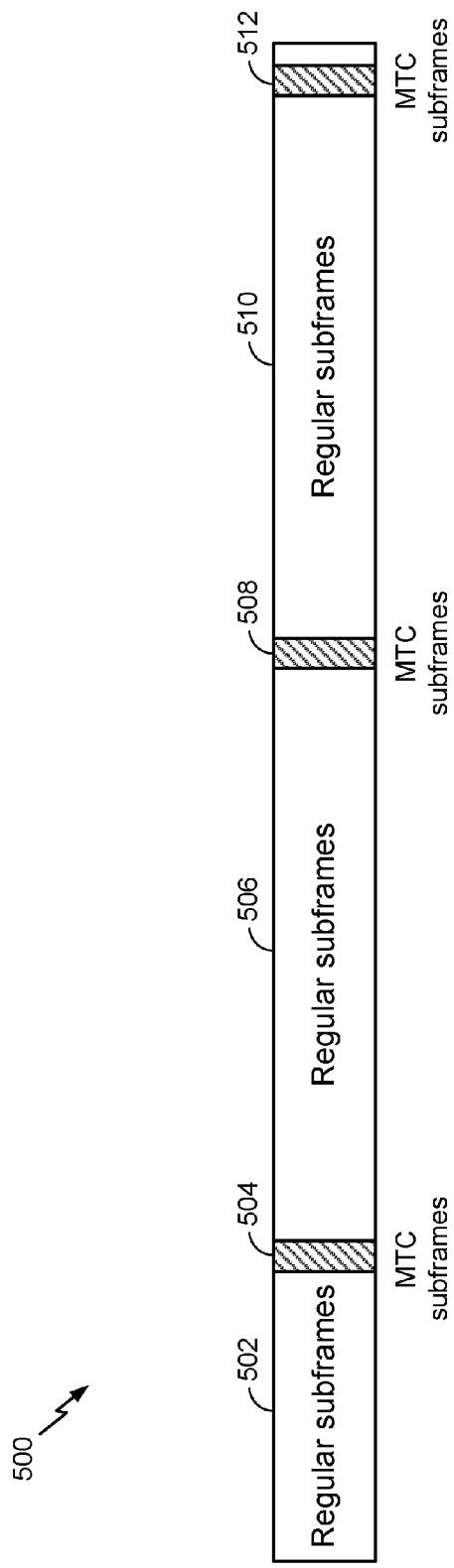
FIGS. 5 and 5A illustrate an example of machine type communications (MTC) co-existence within a wideband system, such as long term evolution (LTE), in accordance with certain aspects of the present disclosure.
Figure 5A:
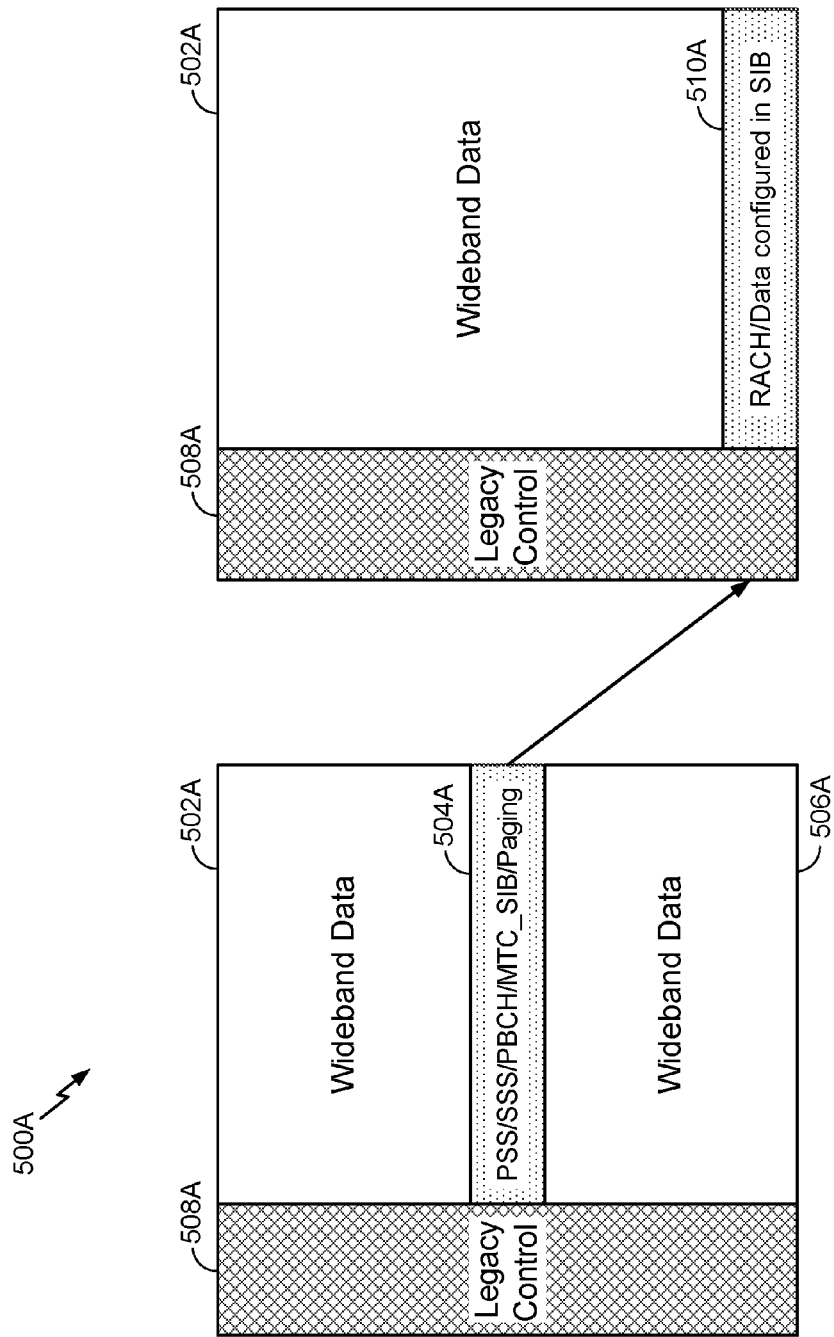

As mentioned above, MTC and/or eMTC operation may be supported (e.g., in coexistence with LTE or some other RAT) in the wireless communication network (e.g., wireless communication network 100). FIGS. 5 and 5A illustrate an example of how low cost UEs in MTC operation may co-exist within a wideband system, such as LTE.

As illustrated in the example frame structure 500 of FIG. 5, subframes associated with MTC and/or eMTC operation may be time division multiplexed (TDM) with regular subframes associated with LTE (or some other RAT). For example, regular subframe may occurring at time instances 502, 506, and 510 can be TDM with MTC subframes occurring at time instances 504, 508, and 512. As shown in FIG. 5, in one example implementation, the number of subframe associated (e)MTC operation may be relatively small compared to the number of regular subframes.

Additionally or alternatively, as illustrated in the example frame structure 500A of FIG. 5A, one or more narrowbands used by low cost UEs in MTC may be frequency division multiplexed (FDM) within the wider bandwidth supported by LTE. Multiple narrowband regions may be supported for MTC and/or eMTC operation, with each narrowband region spanning a bandwidth that is no greater than a total of 6 RBs. In some cases, each low cost UE in MTC operation may operate within one narrowband region (e.g., at 1.4 MHz or 6 RBs) at a time. However, low cost UEs in MTC operation, at any given time, may re-tune to other narrowband regions in the wider system bandwidth. In some examples, multiple low cost UEs may be served by the same narrowband region. In other examples, multiple low cost UEs may be served by different narrowband regions (e.g., with each narrowband region spanning 6 RBs). In yet other examples, different combinations of low cost UEs may be served by one or more same narrowband regions and/or one or more different narrowband regions.

As shown in FIG. 5A, in a subframe 500A, the low cost UE can monitor a wideband region 508A for legacy control information and wideband regions 502A and 506A for data. The low cost UEs may operate (e.g., monitor/receive/transmit) within the narrowband regions for various different operations. For example, as shown in FIG. 5A, a first narrowband region 504A (e.g., spanning no more than 6 RBs) of a subframe may be monitored by one or more low cost UEs for either a primary synchronization signal (PSS), a secondary synchronization signal (SSS), a physical broadcast channel (PBCH), MTC signaling, or paging transmission from a BS in the wireless communication network. As also shown in FIG. 5A, the low cost UE can retune to a second narrowband region 510A (e.g., also spanning no more than 6 RBs of the wideband data) of a subframe to transmit a RACH or data previously configured in signaling received from a BS. In some cases, the second narrowband region 510A may be utilized by the same low cost UEs that utilized the first narrowband region 504A (e.g., the low cost UEs may have re-tuned to the second narrowband region to transmit after monitoring in the first narrowband region). In some cases (although not shown), the second narrowband region 510A may be utilized by different low cost UEs than the low cost UEs that utilized the first narrowband region 504A.

Although the examples described herein assume a narrowband of 6 RBS, those skilled in the art will recognize that the techniques presented herein may also be applied to different sizes of narrowband regions.

Example Paging Enhancements for Low Cost EMTC

As mentioned above, in certain systems (e.g., LTE Rel-13 systems), narrowband operation for enhanced machine type communications (eMTC) may be supported. Further, as also mentioned above, different modes of operation for low cost devices, such as low cost user equipment (UEs) in eMTC, which may use different amounts of repetition before a message is successfully received and/or transmitted by the low cost UEs, may also be supported. In some situations, due to support for narrowband operation, the base station (BS) and/or the low cost UEs may not know which narrowband region out of the available system bandwidth a paging message should be transmitted (e.g., by the BS) or monitored (e.g., by the low cost UEs). Further, in some situations, due to the different coverage modes supported, the BS may know how much bundling of the paging messages may be needed for the low cost UEs to successfully receive the paging message.

Accordingly, aspects of the present disclosure provide techniques for determining, from the available system bandwidth, which narrowband region(s) the low cost UEs should monitor for a bundled paging message transmitted from a BS. Further, techniques presented herein may also allow for determining and/or adapting the bundling size of the paging message based on one or more triggers.

Figure 6:
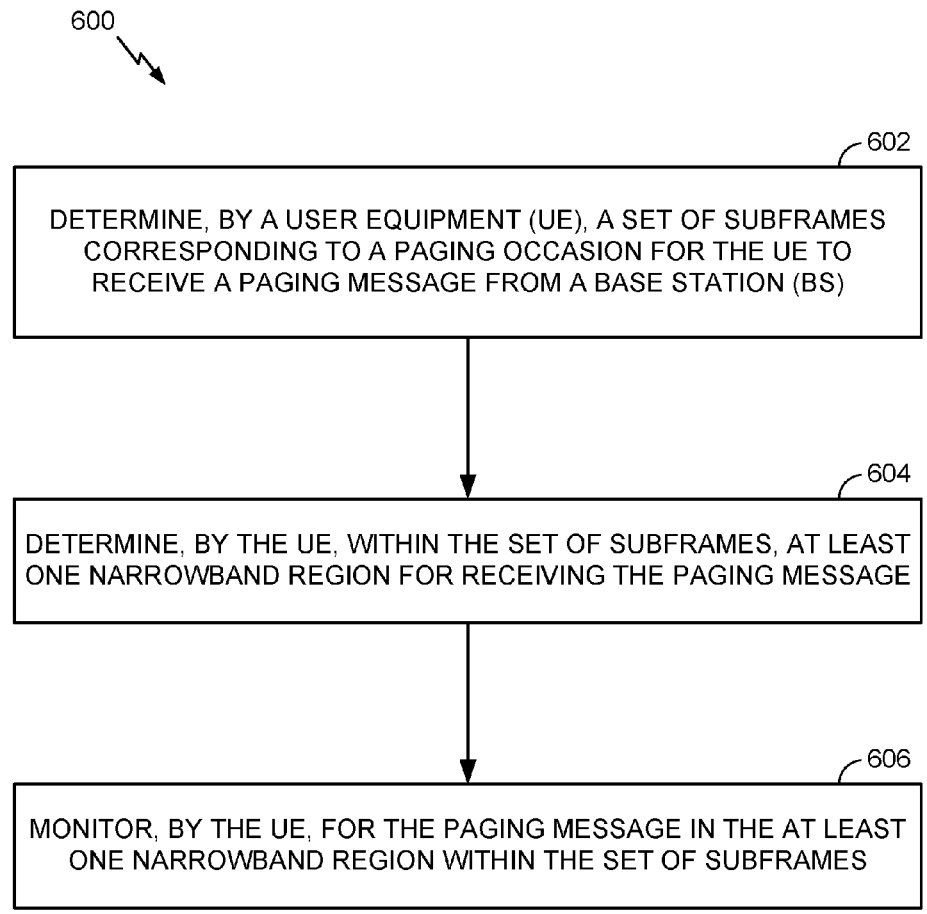
FIG. 6 illustrates example operations for wireless communications, by a UE, in accordance with certain aspects of the present disclosure.
Figure 6A:
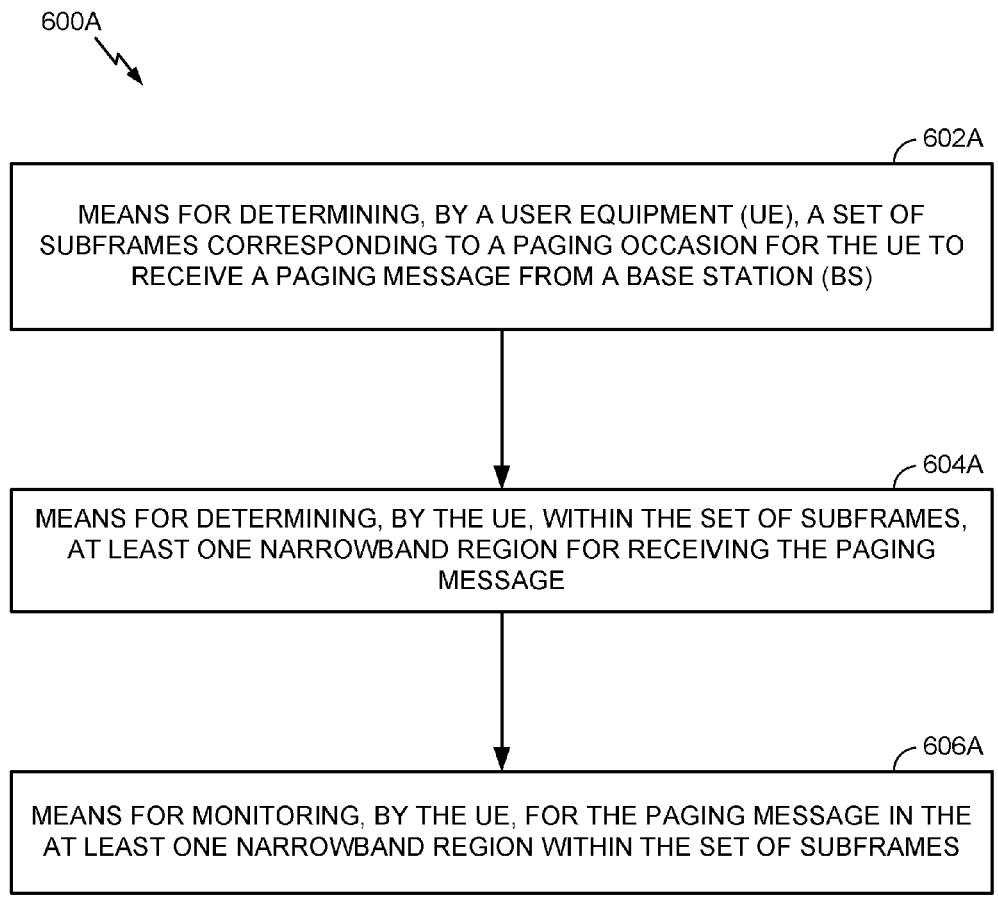
FIG. 6A illustrates example means capable of performing the operations set forth in FIG. 6.

FIG. 6 illustrates example operations 600 for wireless communications, in accordance with certain aspects of the present disclosure. The operations 600 can be performed by a UE, such as a low cost UE, which may be one of the UEs 120 illustrated in FIGS. 1 and 2. The operations 600 may begin, at 602, by determining a set of subframes corresponding to a bundled paging occasion for the UE to receive a bundled paging message from a BS. At 604, the UE determines, within the set of subframes, at least one narrowband region for receiving the paging message. At 606, the UE monitors for the paging message in the at least one narrowband region within the set of subframes. FIG. 6A illustrates example means capable of performing the operations set forth in FIG. 6.

Figure 7:
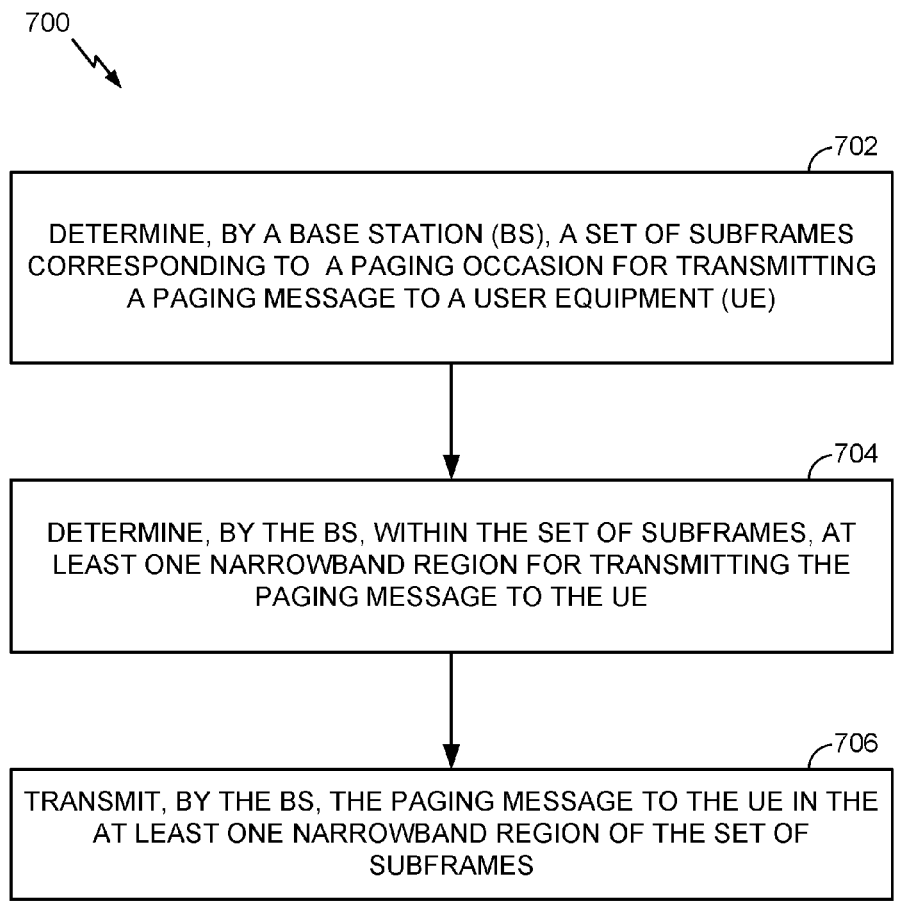
FIG. 7 illustrates example operations for wireless communications, by a BS, in accordance with certain aspects of the present disclosure.
Figure 7A:
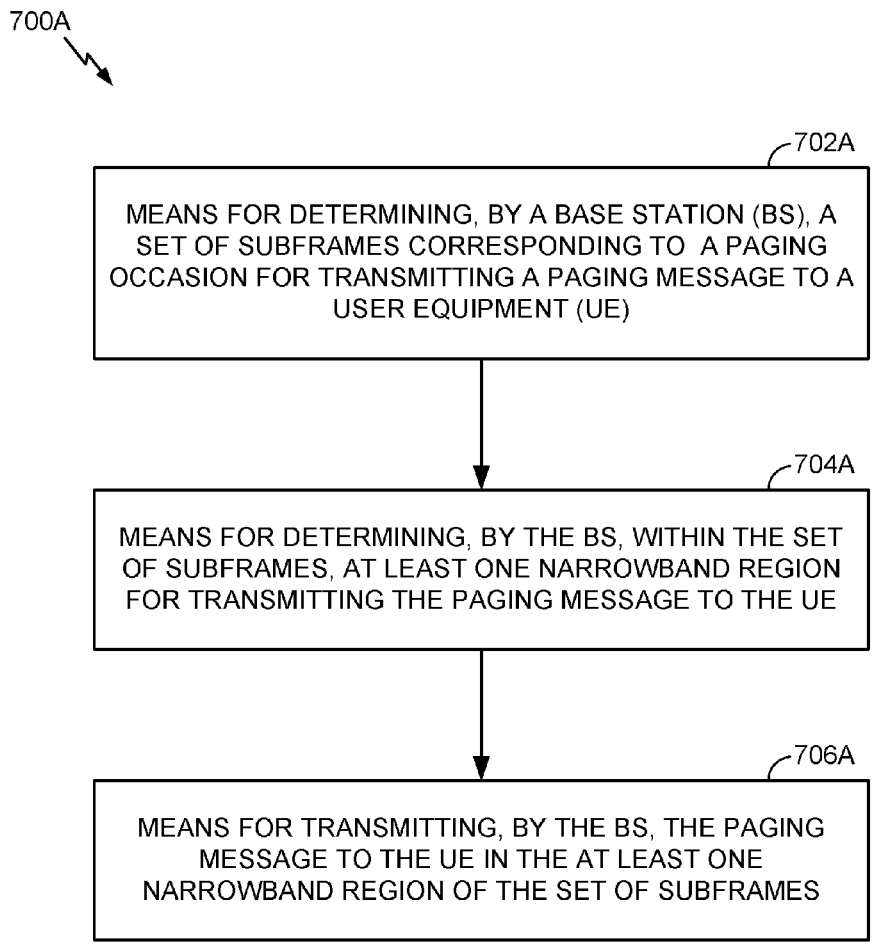
FIG. 7A illustrates example means capable of performing the operations set forth in FIG. 7.

FIG. 7 illustrates example operations 700 for wireless communications, in accordance with certain aspects of the present disclosure. The operations 700 can be performed by a BS, such as one of the BSs/eNBs 110 illustrated in FIGS. 1 and 2, and may be corresponding network side operations to the operations 600. The operations 700 may begin, at 702, by determining a set of subframes corresponding to a bundled paging occasion for transmitting a bundled paging message to a UE, such as a low cost UE. At 704, the BS determines, within the set of subframes, at least one narrowband region for transmitting the paging message to the UE. At 706, the BS transmits the paging message to the UE in the at least one narrowband region of the set of subframes. FIG. 7A illustrates example means capable of performing the operations set forth in FIG. 7.

As mentioned above, in some systems (e.g., for LTE Rel-13), the paging procedure for low cost UEs may allow for narrowband operation and/or paging repetition (e.g., bundling) with varying bundle sizes (e.g., multiple subframe bundling sizes may be supported). As used herein, the bundling size of a paging message may refer to the number of subframes in which the paging message is transmitted/repeated to the low cost UE.

According to certain aspects, in order for devices (e.g., low cost UEs and/or BSs) in the wireless communication network to know which paging resource the low cost UEs should monitor for a paging message transmitted from the BS, the paging resource may first need to be determined. For example, in certain systems (e.g., LTE Rel-13 systems), the paging resource may include the paging frame (PF), paging occasion (PO) and paging narrowband region (PNB) (e.g., as opposed to just the PF and PO in conventional paging procedures).

The PF, in general, may refer to one radio frame, which may contain one or multiple POs in which a bundled paging message may be transmitted. The PO, in general, may refer to a subframe within a PF in which the BS/network may page the low cost UE. For example, in a PO configured for the low cost UE, the low cost UE may monitor the physical downlink control channel (PDCCH) or enhanced PDCCH (ePDCCH) for any transmissions of a paging radio network temporary identifier (P-RNTI) addressing the paging message. According to certain aspects, a bundled PO may refer to a plurality of subframes in which the BS/network may transmit a bundled paging message to the low cost UE.

Example Paging Resources Determination

Figure 8:
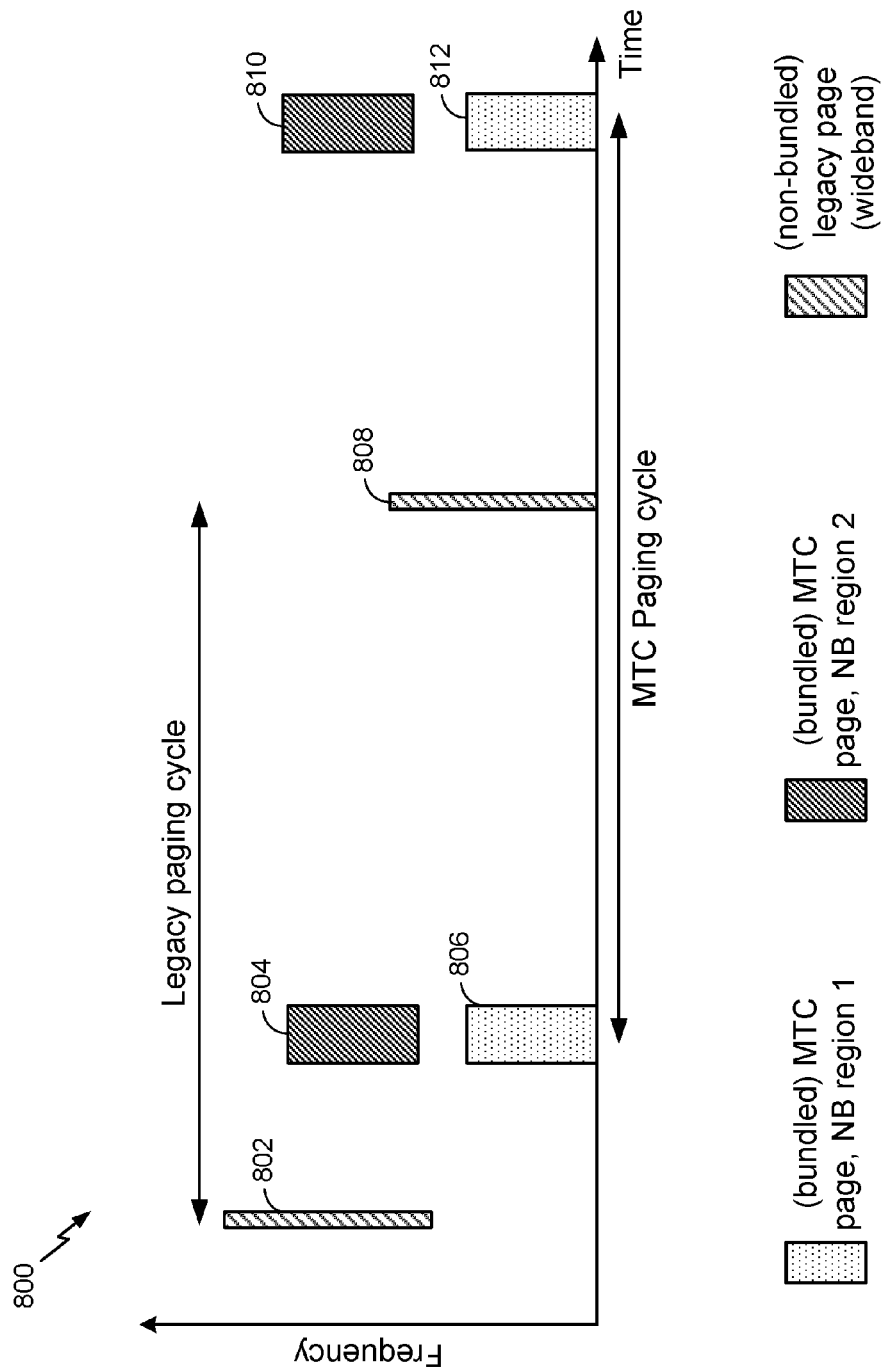
FIG. 8 illustrates an example of transmissions from multiple devices that may be multiplexed together, in accordance with certain aspects of the present disclosure.

According to certain aspects, the determination of the PF and bundled PO (which may correspond to a plurality of subframes in which a bundled paging message may be transmitted from the BS) may be determined based on formulas currently used for determining PF and PO in conventional paging procedures (e.g., for legacy LTE). These formulas (for PF and PO) may be based, in part, on a system frame number (SFN) and a UE_ID that uniquely identifies the low cost UE. After the determination of the PF and bundled PO, the low cost UE and/or BS may determine at least one narrowband (NB) region in which the low cost UE may monitor for a bundled paging message transmitted from the BS (e.g., tuning to an appropriate narrowband region to monitor for the paging message). FIG. 8, for example, is time/frequency graph illustrating an example of how different narrowband regions for low cost UEs may be utilized in a MTC paging cycle.

As shown in FIG. 8, a legacy paging cycle utilized for legacy UEs and a MTC paging cycle utilized for low cost UEs may co-exist within the same wireless communication system. For example, legacy pages (e.g., that do not use bundling) associated with the legacy paging cycle, however, may be wideband pages restricted to a certain bandwidth, as compared to the MTC page associated with the MTC paging cycle that may be transmitted, with bundling, on one or more narrowband regions partitioned out of the total available bandwidth. For example, as shown in FIG. 8, during the MTC paging cycle one or more low cost UEs may monitor for a MTC page that may be transmitted in narrowband regions 1 (806 and 812), while one or more different low cost UEs may monitor for a MTC page that may be transmitted in narrowband regions 2 (804 and 810). During the legacy paging cycle, legacy UEs may monitor for a legacy page transmitted in wideband regions 802 and 808. As shown in FIG. 8, the legacy paging cycle and the MTC paging cycle may overlap.

According to certain aspects, the MTC pages (shown in FIG. 8) may be bundled paging messages. As mentioned above, the bundled paging message may refer to the number of subframes in which the paging message is transmitted/repeated in one MTC paging cycle. Although not shown, the amount of bundling for MTC page in narrowband regions 1 804 and 810 and for MTC page in narrowband regions 2 806 and 812 may be the same (as shown) or different (not shown). Further, although not shown, the amount of bundling for the MTC pages may vary between paging cycles.

According to certain aspects, the determination of the narrowband region may be based on a default narrowband region. For example, in some cases, the default narrowband region may include the center 6 RBs of the available system bandwidth and the low cost UE may be configured to always tune to the center 6 RBs. In general, however, those of ordinary skill in the art will appreciate that other default narrowband regions may be supported/configured.

According to certain aspects, the determination of the narrowband region may be based on an identification (ID) of the low cost UE. For example, in some cases, the UE ID may be similar to the UE_ID utilized in the determination of PF and PO in conventional paging procedures. In some cases, the UE ID may be an ID that uniquely identifies the low cost UE but that is different from the UE_ID utilized in conventional paging procedures. In some aspects, if there are one or more narrowband regions determined, the UE ID may be utilized to randomize the low cost UEs across the one or more determined narrowband regions.

According to certain aspects, the determination of the narrowband region may be based on signaling from the BS. For example, in one case, the low cost UE may receive radio resource control (RRC) signaling and/or Non-Access Stratum (NAS) signaling explicitly indicating which narrowband region the low cost UE should monitor for a bundled paging message transmitted from the BS. In some cases, the low cost UE may implicitly determine, based on signaling indicating the size of the bundled paging message, which narrowband region it should monitor for a bundled paging message transmitted from the BS. For example, one or more low cost UEs in the wireless communication system may be grouped together based on bundling sizes (e.g., depending on radio conditions for that particular group, etc.) and the different groups of low cost UEs may be assigned to different narrowband regions within the available system bandwidth.

According to certain aspects, instead of reusing conventional procedures for the determination of PF and PO, the determination of the plurality of subframes corresponding to the (bundled) PO and the one or more narrowband regions may be jointly determined (e.g., determined based on a same algorithm/formula). In certain aspects, the one or more narrowband regions within each subframe of the plurality of subframes may be considered as additional PO resources in time and/or frequency. For example, if there are N narrowband regions, then the devices (e.g., BS and/or low cost UEs) may determine that there are N times the PO resources. In certain aspects, the joint determination of the one or more narrowband regions (e.g., the N*PO PO resources) and plurality of subframes may be based on the UE ID and/or signaling from the BS.

The various techniques described above may be combined in order to determine which narrowband region, out of the available system bandwidth, the low cost UE should monitor for a bundled paging message transmitted from the BS. For example, in one case, the low cost UE may initially receive signaling explicitly indicating the narrowband region, however, if the low cost UE determines that signaling is not available, the low cost UE may resort to making the determination based on a UE ID, default value, etc.

Example Paging Bundling Size Determination

As mentioned above, techniques described herein may also allow for the UE and/or BS to determine and/or adapt the bundling size for bundled paging messages transmitted by the BS. For example, in some cases, the low cost UE can determine bundling size based on signaling from the BS. In some cases, the bundling size may be determined based on the narrowband region used by the BS to transmit the paging message to the low cost UE. For example, as mentioned above, each of the one or more narrowband regions partitioned out of the available system bandwidth may support a particular amount of bundling for the transmission of paging messages. Further, as also mentioned above, the amount of bundling supported by some of the narrowband regions may be the same (or different) as the amount of bundling supported by other narrowband regions. Thus, in some cases, upon determining which narrowband region will be used to transmit a paging message, the BS and/or low cost UE may determine, based on the supported bundling size used in that narrowband region, the particular bundling size that will be used for the paging message. In some cases, the low cost UE may then monitor for the paging message in the narrowband region of the plurality of subframes, based on the determined bundling size. Similarly, in some cases, the BS may transmit the paging message to the UE in the narrowband region of the plurality of subframes based on the determined bundling size.

According to certain aspects, the low cost UE may indicate a connection mode to the network (e.g., Mode 1, Mode 2, Mode 3, etc.). The bundling size for the PF may be determined based on the connection mode. For example, a connection mode (e.g., Mode 1) may indicate that the UE is deployed in non-mobility mode (e.g., the low cost UE is generally expected to be deployed in a fixed location where the UE is camping/served under the same BS). Another connection mode (e.g., Mode 2) may indicate that the UE is deployed in a regular mobility mode. The connection mode (e.g., Mode 1) may also indicate that the low cost UE is deployed in a normal power preference mode and another connection mode (e.g., Mode 2) may indicate that the low cost UE is deployed in a low power preference mode. According to certain aspects, the connection mode of the low cost UE may determine UE behavior upon cell selection/re-selection. For example, if the low cost UE is deployed in one connection mode (e.g., Mode 1), a random access procedure may be triggered/performed. Alternatively, if the low cost UE is deployed in another connection mode (e.g., Mode 2), for example, the low cost UE may determine bundling size based on a pre-configured value. In aspects, the low cost UE may select a new value for bundling size for paging messages.

According to certain aspects, the BS may transmit paging messages to the UE by sending multiple bundled transmissions of the paging message to the UE until a response from the UE is detected or until an indication is received from the network. According to certain aspects, the multiple bundled transmissions may be of increasing bundling sizes. As one example, a bundling size of each bundled transmission of the multiple bundled transmissions is larger than a bundling size of the previous bundled transmission of the multiple bundled transmissions.

Figure 9:
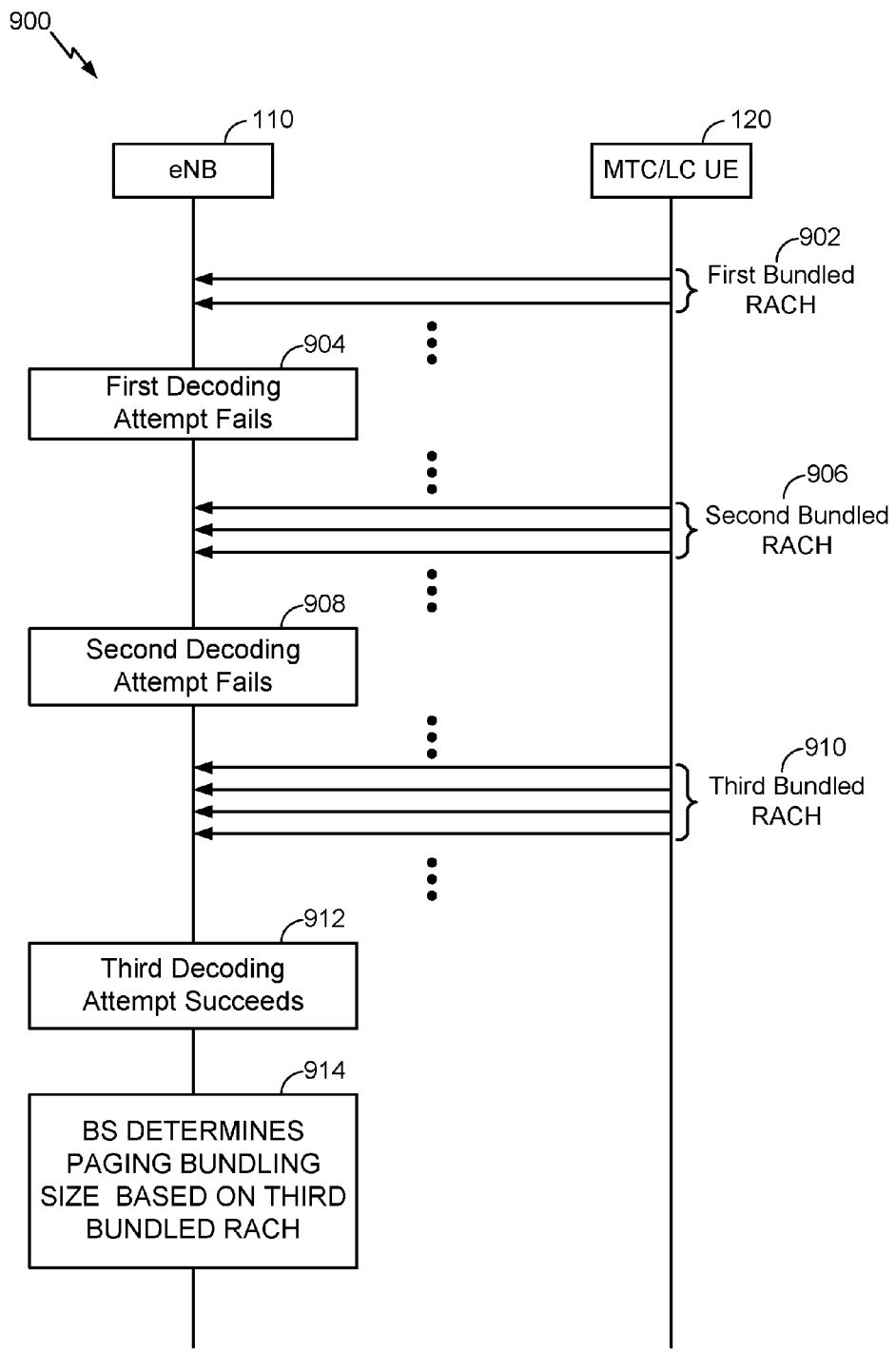
FIGS. 9-10 illustrate example call flows for determining the bundling size of a paging message transmitted to a UE by a BS, in accordance with certain aspects of the present disclosure.
Figure 10:
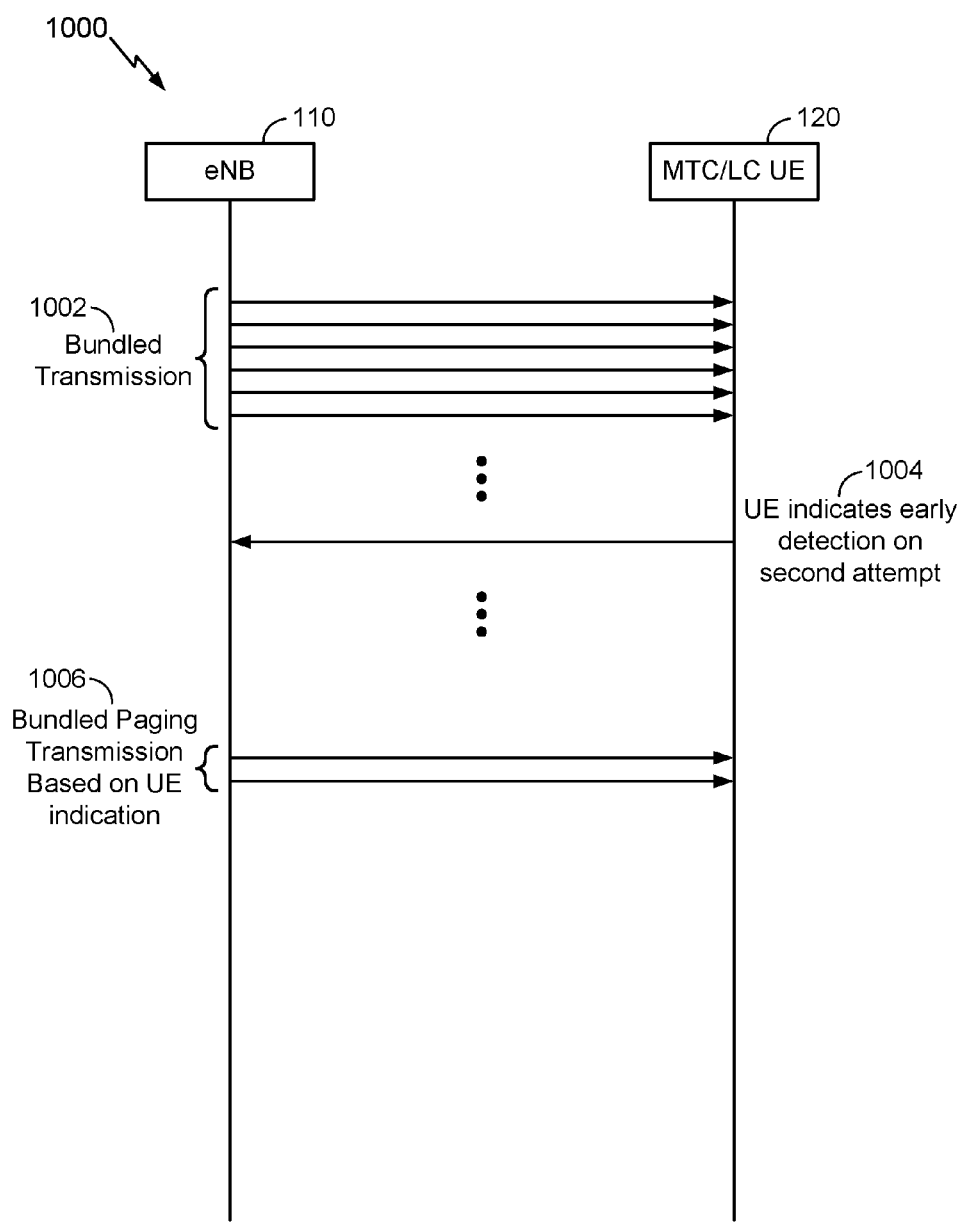

FIGS. 9 and 10 illustrate example call flows 900 and 1000, respectively, for determining the bundling size of the paging message transmitted to the low cost UEs by the BS. The eNB and MTC device (e.g., a low cost UE) illustrated in FIGS. 9 and 10 may be any of the BSs/eNBs 110 and UEs 120, respectively, illustrated in FIGS. 1 and 2.

According to certain aspects, as shown in FIG. 9, the bundling size may be determined based on a bundling size of a bundled random access channel (RACH) transmission that is successfully decoded by the BS.

When performing a RACH (e.g., transmits RACH messages) on the uplink, the low cost UE may attempt multiple bundle sizes of the RACH transmission until the BS is able to successfully decode the RACH transmission. For example, as shown in FIG. 9, on a first attempt at 902, the low cost UE 120 may attempt a bundling size of two for the first bundled RACH transmission (e.g., two repetitions of the RACH transmission). If the first attempt fails at 904, on a second attempt at 906, the low cost UE 120 can use a bundling size of three for the second bundled RACH transmission. Similarly, if the second attempt fails at 908, on a third attempt at 910, the UE can use a bundling size of four for a third bundled RACH transmission, etc. According to certain aspects, the determination of the bundling size for the bundled paging message may be determined (e.g., by the BS) based on the size of the bundled RACH that is successfully decoded by the BS. For example, as shown, if on the third decoding attempt, the BS successfully decodes the third bundled RACH, the BS may determine the paging bundling size based on the third bundled RACH.

As shown in FIG. 9, if the RACH attempt succeeds, for example at 912 after the third bundled RACH transmission, the eNB 110 can determine a bundling size for paging based on the bundling size for the third bundled RACH transmission at 914.

According to certain aspects, as shown in FIG. 10, the bundling size may be determined based on a number of attempts needed to successfully decode (e.g., early decode) a bundled transmission from the BS.

For example, as shown in FIG. 10, the low cost UE 120 may receive a bundled broadcast transmission at 1002 (e.g., with one or more repetitions of the broadcast transmission) and may attempt to early decode the bundled broadcast transmission (e.g., successfully decode the broadcast transmission before receiving all of the repetitions). If the low cost UE 120 is able to early decode the broadcast transmission, the low cost UE 120 may indicate that the broadcast transmission was early decoded at 1004.

According to certain aspects, the determination of the bundling size for the bundling paging message at 1006 may be determined (e.g., by the BS) based on the early decode indication from the low cost UE 120. In certain aspects, the early decode indication may also be used to adjust the bundling size. For example, as shown, based on the indication from the low cost UE 120, the BS 110 may transmit a bundled paging message with a bundling size of two.

According to certain aspects, the bundling size may be determined based on measurement reports transmitted from the low cost UE. For example, the low cost UE may transmit one or more measurement reports to the BS during a transition from RRC idle to RRC connected and the BS can use one or more values in the measurement report to determine the bundling size for the bundled paging message. The one or more values (e.g., RSRP, signal to noise ratio (SNR), etc.) may be indicative of the radio conditions between the low cost UE and the BS. Based on the one or more values in the measurement report(s), the BS can decide whether the bundling size for paging should be increased (e.g., if the measurement report(s) indicate poor radio conditions, for example, below some threshold) or decreased (e.g., if the measurement report(s) indicate radio conditions that are above some threshold).

According to certain aspects, the bundling size for paging may also be determined based on successful decoding of one or more bundled paging messages transmitted by the BS.

For example, in some cases, the BS may transmit bundled blank paging messages (e.g., paging messages meant for probing) to the low cost UE, where each of the bundled blank paging messages may be transmitted at bundle sizes that are known to the low cost UE. Referring again to FIG. 10, for example, the bundled transmission may be a bundled blank paging transmission with a bundling size of six (known by the low cost UE 120) that is periodically transmitted by the BS 110. The low cost UE 120 may then attempt to decode the bundled blank paging messages and may inform the BS 110 as to which paging messages were successful. For example, the low cost UE 120 successfully decodes the paging message after two attempts (i.e., the second out of six repetitions), the low cost UE 120 may indicate to the BS 110 that the low cost UE 120 was able to successfully decode the bundled paging message after two attempts. If the low cost UE 120 was not able to successfully decode the bundled paging message, the low cost UE 120 may indicate to the BS 110 that it was not able to successfully decode the paging message. The BS 110 may then use the indicated information to determine an updated bundling size (e.g., a decreased or increased bundling size relative to the previous bundling size) for the bundled paging message. For example, based on the indication from the low cost UE 120, the BS 110 may determine that the bundling size of two is sufficient for the bundled paging message.

Example Triggers for Determining Bundling Size for Paging

According to certain aspects, determination of the bundling size (e.g., by the BS) can be triggered. In some cases, these triggers may allow the bundling size of the bundled paging message to be adapted/updated (as mentioned above) when one or more conditions are satisfied.

According to certain aspects, the determination of the bundling size may be triggered each RRC connection attempt by the low cost UE. For example, every time the low cost UE makes a transition from RRC Idle to RRC Connected, the BS may determine a bundling size for the bundled paging message to be transmitted to the low cost UE (e.g., radio conditions, measurement reports from the low cost UE, etc.). The BS can signal an indication of the bundled paging size to the low cost UE.

According to certain aspects, the determination of the bundling size can also be triggered during an initial attachment procedure or during a tracking area update (TAU) by the low cost UE (e.g., which may occur as part of a RRC or NAS procedure). According to certain aspects, the determination of bundling size can be triggered when the low cost UE selects or reselects a new cell. For example, in some cases, when the low cost UE selects or moves to a new cell, the radio conditions between the low cost UE and the new cell can change and the new cell may not have knowledge of the updated conditions. To address this, techniques presented herein may allow for the bundling size to be determined every time the low cost UE selects or re-selects the new cell. In an example implementation, when the low cost UE selects or re-selects the new cell, the low cost UE can initiate an RRC connection to trigger the determination of the new bundling size.

According to certain aspects, determination of bundling size for paging can be triggered by the low cost UE. For example, the low cost UE may determine that the current bundling size set by the BS is incorrect and should be updated based one or more conditions. In some cases, the low cost UE may determine that the current bundling size should be updated (e.g., trigger the determination) if the low cost UE has not received a paging message over a certain period of time (e.g., longer than a threshold period). In some cases, the low cost UE may determine that the current bundling size should be updated if the low cost UE detects that it is capable of acquiring a page with significantly less bundling than the bundling size used by the BS for a previously transmitted bundled paging message (e.g., if the low cost UE early decodes in a similar manner as shown in FIG. 10). In some cases, the low cost UE may determine that the current bundling size should be updated if the low cost UE determines, based on one or more measurements (e.g., RSRP, SNR, etc.), that the radio conditions between the low cost UE and the BS have significantly changed.

If the low cost UE determines that the bundling size should be updated, the low cost UE can trigger the bundling size update by performing an RRC Connection procedure. According to certain aspects, the low cost UE can also trigger the determination of the bundling size periodically, for example, by performing the RRC Connection procedure periodically to update the bundling size for paging.

According to certain aspects, the low cost UE may be informed about the determined bundling size for the paging message (e.g., implicitly or explicitly by the BS). In one example, the low cost UE may be informed about the determined bundling size semi-statically (e.g., before the low cost UE returns to RRC Idle). In another example, the low cost UE may be informed about the determined bundling size dynamically (e.g., as part of the paging message grant). According to certain aspects, the BS may also inform neighbor BSs/eNBs and/or the MME about the determined bundling size for paging.

The various techniques described above may be combined in order to determine a bundling size for the bundled paging message and/or to determine when the determination of the bundling size is triggered. For example, in one case, the BS may receive a measurement report with one or more measurements made by the low cost UE while the low cost UE is in RRC Connected mode and/or an early decoding indication from the low cost UE based on early decoding of a bundled broadcast transmission by the BS. In another case, the determination of the bundling size may be triggered periodically by the low cost UE and/or every time the low cost UE selects or reselects a new cell. In general, those of ordinary skill in the art will appreciate that other similar techniques described herein may also be combined in order to enhance the paging procedures for low cost UEs.

Further, the various techniques described herein may be used to enhance paging procedures for MTC and eMTC. Those of ordinary skill in the art will appreciate that the techniques presented herein may also be applied to other procedures in MTC and/or eMTC, such as random access procedures, transmission/reception of system information, etc.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. One or more processors, circuits, or other devices may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means receiving and/or means for monitoring may include a receiver, such as receive processor 238, MIMO detector 236, demodulator(s) 232a-232t, and/or antenna(s) 234a-234t of the base station 110 illustrated in FIG. 2 and/or MIMO detector 256, receive processor 258, demodulator(s) 254a-254r, and/or antenna(s) 252a-252r of the user equipment 120 illustrated in FIG. 2. Means for determining, means monitoring, means for decoding, means for indicating, means for selecting, and/or means for performing, may include one or more processors (or a processing system), such as controller/processor 240, scheduler 246, transmitter processor 220, receive processor 238, MIMO detector 236, TX MIMO processor 230, and/or modulator(s)/demodulator(s) 232a-232t of the base station 110 illustrates in FIG. 2, and/or controller/processor 280, receive processor 258, transmit processor 264, MIMO detector 256, TX MIMO processor 266, and/or modulator(s)/demodulator(s) 254a-254r of the user equipment 120 illustrated in FIG. 2. Means for signaling, means for transmitting, and/or means for indicating may include a transmitter, such as transmit processor 220, TX MIMO processor 230, modulator(s) 232a-232t, and/or antenna(s) 234a-234t of the base station 110 illustrated in FIG. 2, and/or transmit processor 264, TX MIMO processor 266, modulator(s) 254a-254r, and/or antenna(s) 252a-252r of the user equipment 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining one or more subframes corresponding to a paging occasion, wherein the UE monitors for a bundled paging message from a base station (BS) starting at the one or more subframes;
   attempting to decode the bundled paging message, the bundled paging message associated with a bundling size;
   determining the bundling size based at least in part on successful decoding of at least one subframe of the bundled paging message;
   determining at least one narrowband region, of a plurality of narrowband regions of a system bandwidth, in which the UE monitors for the bundled paging message, wherein the determination of the at least one narrowband region is based on an identification (ID) of the UE and signaling from the BS; and
   monitoring for the bundled paging message based at least in part on the determined bundling size in the at least one narrowband region, starting at the one or more subframes.

2. The method of claim 1,
   wherein the bundling size corresponds to a number times that a subframe of the bundled paging message is repeated.

3. The method of claim 1, wherein the determination of the bundling size is based at least in part on the determined at least one narrowband region.

4. The method of claim 1, wherein:
   the at least one narrowband region comprises a plurality of narrowband regions; and
   the signaling comprises an indication of at least a first narrowband region of the at least one narrowband region.

5. The method of claim 1, wherein
   the one or more subframes and the at least one narrowband region are jointly determined.

6. The method of claim 1, wherein the determination of the bundling size is based at least in part on signaling from the BS.

7. The method of claim 1, wherein the determination of the bundling size is based at least in part on a bundling size of a bundled random access channel (RACH) transmission, successfully decoded by the BS.

8. The method of claim 1, further comprising:
   decoding a bundled broadcast transmission from the BS, wherein the bundling size for the monitoring is determined based at least in part on a number of attempts to successfully decode the bundled broadcast transmission from the BS.

9. The method of claim 1, wherein the determination of the bundling size is based at least in part on measurements performed by the UE.

10. The method of claim 9, further comprising:
    transmitting one or more measurement reports to the BS, wherein the bundling size is further determined based on the measurement reports.

11. The method of claim 1, wherein the determination of the bundling size is triggered by a radio resource control (RRC) connection attempt by the UE.

12. The method of claim 1, wherein the determination of the bundling size is triggered by an initial attachment or a tracking area update by the UE.

13. The method of claim 1, wherein the determination of the bundling size is triggered by the UE selecting or reselecting a new cell.

14. The method of claim 1, wherein the determination of the bundling size is triggered by an indication that the UE has not received a paging message over a period of time.

15. The method of claim 1, wherein the determination of the bundling size is triggered by an indication that the UE is capable of acquiring a paging message with a smaller bundling size than a bundling sized used by the BS for a previously transmitted bundled paging message.

16. The method of claim 1, wherein the determination of the bundling size is triggered periodically by the UE.

17. The method of claim 1, further comprising:
    determining a connection mode of the UE, and wherein the determination of the bundling size is based at least in part on the connection mode.

18. The method of claim 17, wherein the connection mode comprises a first connection mode that indicates that the UE is deployed in a non-mobility mode or a second connection mode that indicates that the UE is deployed in a mobility mode.

19. The method of claim 17, wherein the connection mode comprises a first connection mode that indicates that the UE is deployed in a normal power preference mode or a second connection mode that indicates that the UE is deployed in a low power preference mode.

20. The method of claim 17, further comprising:
    selecting a second BS to communicate with;
    performing a random access procedure if the UE is deployed in a first connection mode, and determining the bundling size based at least in part on a pre-configured or selected value if the UE is deployed in a second connection mode.

21. The method of claim 1, wherein the determination of the at least one narrowband region is based at least in part on a default narrowband region.

22. A method for wireless communications by a base station (BS), comprising:

determining one or more subframes corresponding to a paging occasion, wherein the BS transmits a bundled paging message to a user equipment (UE) starting at the one or more subframes;

transmitting the bundled paging message to the UE, the bundled paging message associated with a bundling size, wherein the bundling size is determined by the UE based at least in part on successful decoding of at least one subframe of the bundled paging message;

determining at least one narrowband region, of a plurality of narrowband regions of a system bandwidth, in which the BS transmits the bundled paging message to the UE, wherein the determination of the at least one narrowband region is based on an identification (ID) of the UE and signaling from the BS; and transmitting the bundled paging message to the UE based at least in part on the bundling size in the at least one narrowband region, starting at the one or more subframes.

23. The method of claim 22, further comprising:
wherein the bundling size corresponds to a number times that a subframe of the bundled paging message is repeated.

24. The method of claim 22, wherein the determination of the bundling size is based at least in part on the determined at least one narrowband region.

25. The method of claim 22, further comprising signaling an indication of the at least one narrowband region to the UE.

26. The method of claim 25, wherein:
the at least one narrowband region comprises a plurality of narrowband regions; and
the signaling comprises an indication of a first narrowband region of the at least one narrowband region.

27. The method of claim 22, wherein
the one or more subframes and the at least one narrowband region are jointly determined.

28. The method of claim 22, wherein the determination of the bundling size is based at least in part on a bundling size of a bundled random access channel (RACH) transmission from the UE, successfully decoded by the BS.

29. The method of claim 22, further comprising:
transmitting a bundled broadcast transmission to the UE;
receiving, from the UE, an indication of a number of attempts by the UE to successfully decode the bundled broadcast transmission; and
determining the bundling size for the paging message based at least in part on the indicated number of attempts.

30. The method of claim 22, further comprising:
receiving one or more measurement reports from the UE; and
determining bundling size based at least in part on the one or more measurement reports.

31. The method of claim 22, wherein the determination of the bundling size is triggered by a radio resource control (RRC) connection attempt by the UE.

32. The method of claim 22, wherein the determination of the bundling size is triggered by an initial attach or tracking area update by the UE.

33. The method of claim 22, wherein the determination of the bundling size is triggered by the UE selecting or reselecting a new cell.

34. The method of claim 22, wherein the determination of the bundling size is triggered by an indication that the UE has not received a paging message over a period of time.

35. The method of claim 22, wherein the determination of the bundling size is triggered by an indication that the UE is capable of acquiring a paging message with a smaller bundling size than a bundling size used by the BS for a previously transmitted bundled paging message.

36. The method of claim 22, wherein the determination of the bundling size is triggered periodically by the UE.

37. The method of claim 22, wherein the determination of the bundling size is based on transmitting bundled paging messages to the UE until a response from the UE is detected or until an indication is received from a network.

38. The method of claim 37, further comprising increasing a bundling size for each successive bundled paging message.

39. The method of claim 22, wherein the determination of the at least one narrowband region is based at least in part on a default narrowband region.

40. An apparatus for wireless communications, comprising:
means for determining one or more subframes corresponding to a paging occasion, wherein a user equipment (UE) monitors for a bundled paging message from a base station (BS) starting at the one or more subframes;
means for attempting to decode the bundled paging message, the bundled paging message associated with a bundling size;
means for determining the bundling size based at least in part on successful decoding of the bundled paging message;
means for determining at least one narrowband region, of a plurality of narrowband regions of a system bandwidth, in which the UE monitors for the bundled paging message, wherein the determination of the at least one narrowband region is based on an identification (ID) of the UE and signaling from the BS; and
means for monitoring for the bundled paging message based at least in part on the determined bundling size in the at least one narrowband region, starting at the one or more subframes.

41. An apparatus for wireless communications, comprising:
means for determining one or more subframes corresponding to a paging occasion, wherein a base station (BS) transmits a bundled paging message to a user equipment (UE) starting at the one or more subframes;
means for transmitting the bundled paging message to the UE, the bundled paging message associated with a bundling size, wherein the bundling size is determined by the UE based at least in part on successful decoding of at least one subframe of the bundled paging message;
means for determining at least one narrowband region, of a plurality of narrowband regions of a system bandwidth, in which the BS transmits the bundled paging message to the UE, wherein the determination of the at least one narrowband region is based on an identification (ID) of the UE and signaling from the BS; and
means for transmitting the bundled paging message to the UE based at least in part on the bundling size in the at least one narrowband region, starting at the one or more subframes.

42. An apparatus for wireless communications, comprising:
at least one processor configured to:
determine one or more subframes corresponding to a paging occasion, wherein a user equipment (UE)

monitors for a bundled paging message from a base station (BS) starting at the one or more subframes;

attempt to decode the bundled paging message, the bundled paging message associated with a bundling size;

determine the bundling size based at least in part on successful decoding of at least one subframe of the bundled paging message;

determine at least one narrowband region, of a plurality of narrowband regions of a system bandwidth, in which the UE monitors for the bundled paging message, wherein the determination of the at least one narrowband region is based on an identification (ID) of the UE and signaling from the BS; and monitor for the bundled paging message based at least in part on the determined bundling size in the at least one narrowband region, starting at the one or more subframes; and a memory coupled with the at least one processor.

43. An apparatus for wireless communications, comprising:

at least one processor configured to:

determine one or more subframes corresponding to a paging occasion, wherein a base station (BS) transmits a bundled paging message to a user equipment (UE) starting at the one or more subframes;

transmit the bundled paging message to the UE, the bundled paging message associated with a bundling size, wherein the bundling size is determined by the UE based at least in part on successful decoding of at least one subframe of the bundled paging message;

determine at least one narrowband region, of a plurality of narrowband regions of a system bandwidth, in which the BS transmits the bundled paging message to the UE, wherein the determination of the at least one narrowband region is based on an identification (ID) of the UE and signaling from the BS; and transmit the bundled paging message to the UE based at least in part on the bundling size in the at least one narrowband region, starting at the one or more subframes; and a memory coupled with the at least one processor.

44. A non-transitory computer readable medium having computer executable code stored thereon, comprising:

code for determining one or more subframes corresponding to a paging occasion, wherein a user equipment (UE) monitors for a bundled paging message from a base station (BS) starting at the one or more subframes;

code for attempting to decode the bundled paging message, the bundled paging message associated with a bundling size;

code for determining the bundling size based at least in part on successful decoding of at least one subframe of the bundled paging message;

code for determining at least one narrowband region, of a plurality of narrowband regions of a system bandwidth, in which the UE monitors for the bundled paging message, wherein the determination of the at least one narrowband region is based on an identification (ID) of the UE and signaling from the BS; and code for monitoring for the bundled paging message based at least in part on the determined bundling size in the at least one narrowband region, starting at the one or more subframes.

45. A non-transitory computer readable medium having computer executable code stored thereon, comprising:

code for determining one or more subframes corresponding to a paging occasion, wherein a base station (BS) transmits a bundled paging message to a user equipment (UE) starting at the one or more subframes;

code for transmitting the bundled paging message to the UE, the bundled paging message associated with a bundling size, wherein the bundling size is determined by the UE based at least in part on successful decoding of at least one subframe of the bundled paging message;

code for determining at least one narrowband region, of a plurality of narrowband regions of a system bandwidth, in which the BS transmits the bundled paging message to the UE, wherein the determination of the at least one narrowband region is based on an identification (ID) of the UE and signaling from the BS; and code for transmitting the bundled paging message to the UE based at least in part on the bundling size in the at least one narrowband region, starting at the one or more subframes.

* * * * *